United States Patent [19]

Kagiyama et al.

[11] Patent Number: 4,520,914
[45] Date of Patent: Jun. 4, 1985

[54] CENTRIFUGAL CLUTCH WITH RADIALLY MOVABLE MAGNETIC MEMBER

[75] Inventors: Tsutomu Kagiyama; Tatsuyuki Takaishi, both of Yokohama, Japan

[73] Assignee: Ohi Seisakusho Co., Ltd., Kanagawa, Japan

[21] Appl. No.: 376,212

[22] Filed: May 7, 1982

[30] Foreign Application Priority Data

May 9, 1981 [JP] Japan ............................. 56-66905[U]

[51] Int. Cl.³ .................... F16D 43/16; F16D 27/01; E05C 13/04
[52] U.S. Cl. ............................... 192/71; 192/74; 192/84 PM; 192/103 B; 192/105 BA; 192/105 BB; 70/279; 292/201; 292/DIG. 23; 74/625
[58] Field of Search ................. 192/105 BB, 105 BA, 192/103 B, 84 PM, 71, 74; 70/237, 276, 279, 275; 292/201, DIG. 23; 74/625

[56] References Cited

U.S. PATENT DOCUMENTS

| | | | |
|---|---|---|---|
| 1,988,922 | 1/1935 | Stephenson | 192/105 BA X |
| 2,771,171 | 11/1956 | Schultz | 192/84 PM |
| 2,773,206 | 12/1956 | Zozulin et al. | 192/84 PM |
| 2,983,350 | 5/1961 | Schultz | 192/84 PM |
| 3,194,371 | 7/1965 | Rabinow | 192/84 PM X |
| 3,262,533 | 7/1966 | Keller et al. | 192/105 BA |
| 3,432,016 | 3/1969 | Vogt | 192/84 PM X |
| 3,744,180 | 7/1973 | Mabuchi | 192/105 BB X |
| 3,835,678 | 9/1974 | Meyer et al. | 70/279 X |
| 3,947,060 | 3/1976 | Zimmer et al. | 70/279 X |
| 4,093,289 | 6/1978 | Inabayashi et al. | 292/201 X |
| 4,126,341 | 11/1978 | Bradstock | 292/201 |
| 4,270,783 | 6/1981 | Sorenson et al. | 292/201 X |
| 4,271,944 | 6/1981 | Hanson | 192/84 PM X |
| 4,290,634 | 9/1981 | Gelhard | 292/201 |
| 4,311,331 | 1/1982 | Lutz | 192/105 CE X |
| 4,342,209 | 8/1982 | Kleefeldt | 70/237 X |

FOREIGN PATENT DOCUMENTS

| | | | |
|---|---|---|---|
| 63920 | 8/1892 | Fed. Rep. of Germany . | |
| 2485128 | 12/1981 | France | 70/279 |
| 119231 | 9/1980 | Japan | 192/84 PM |
| 29159 | 7/1909 | Sweden | 192/105 BB |
| 219522 | 7/1924 | United Kingdom | 192/71 |
| 518048 | 2/1940 | United Kingdom | 192/105 BB |
| 647410 | 12/1950 | United Kingdom . | |
| 793676 | 4/1958 | United Kingdom | 192/71 |
| 542044 | 3/1977 | U.S.S.R. | 192/105 BA |
| 718649 | 2/1980 | U.S.S.R. | 192/84 PM |

OTHER PUBLICATIONS

IBM Technical Disclosure Bulletin, vol. 9, No. 1, Jun. 1966, pp. 76 and 77, Centrifugal Clutch by Gadbury et al.

Primary Examiner—Rodney H. Bonck
Assistant Examiner—David D. House
Attorney, Agent, or Firm—Wenderoth, Lind & Ponack

[57] ABSTRACT

An actuator with a positive centrifugal clutch has a clutch drum loosely rotated relative to a rotary drive shaft and is provided with large inner diameter portions and engaging protuberances inwardly projecting from the large inner diameter portions; a clutch body loosely fitted within the clutch drum and driven by the rotary drive shaft, and provided with a retaining hole opening radially from the center thereof toward the inner wall of the clutch drum; and an engaging permanent magnet loosely movably retained in the retaining hole of the clutch body. When the clutch body is in a standstill state, the engaging permanent magnet provides a magnetic attraction between itself and the rotary drive shaft and thereby is accommodated within the retaining hole. When the clutch body continues its rotation, centrifugal force is generated. The centrifugal force causes the engaging permanent magnet to protrude from the retaining hole, come into contact with and slide on the inner wall of the clutch drum and engage with one of the engaging protuberances of the clutch drum. The actuator has an outer casing having a cover plate. The clutch drum has a bevel gear and an axial projection formed integrally at a rear wall of the clutch drum. The axial projection is supported by the cover plate. A lid member is also provided at one end of the drum which is loosely rotatably mounted around the rotary drive shaft and which tightly seals the one end of the drum so as to block entrance of water and dust into the clutch.

2 Claims, 12 Drawing Figures

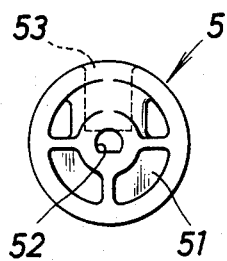
FIG. 7
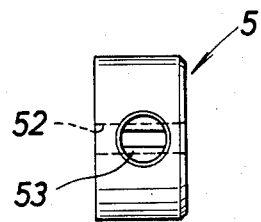
FIG. 8
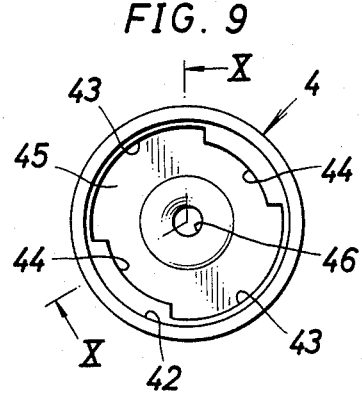
FIG. 9
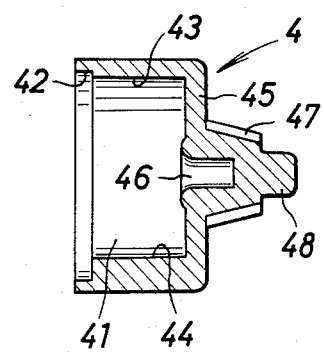
FIG. 10
FIG. 11
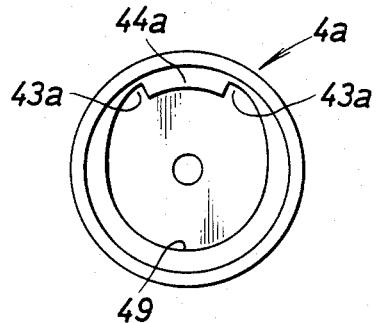
FIG. 12

CENTRIFUGAL CLUTCH WITH RADIALLY MOVABLE MAGNETIC MEMBER

BACKGROUND OF THE INVENTION

The present invention relates to a centrifugal clutch capable of connecting or disconnecting a driving shaft and a driven shaft by utilization of a permanent magnet.

There have heretofore been proposed clutches in which centrifugal force is exerted on a spring, clutches making use of magnetism of an exciting coil, etc. However, these clutches are complicated in construction, entail a disadvantage from an economical point of view and prevent the advancement of productivity.

SUMMARY OF THE INVENTION

In view of the drawbacks of the conventional clutches as described above, the present invention has been made.

An object of the present invention is to provide a centrifugal clutch which has simple construction, has a reduced number of the component parts, excellent durability, is inexpensive to manufacture and is operablle with high precision.

To attain the object descibed above according to the present invention, there is provided a centrifugal clutch comprising a clutch drum loosely rotated relative to a rotary drive shaft which serves as a magnetic substance, and provided with large inner diameter portions and engaging protuberances inwardly protruding from the large inner diameter portions; a clutch body loosely fitted within the clutch drum, driven by the rotary drive shaft fitted therein, and provided with a retaining hole radially opening toward the inner wall of the clutch drum; and a permanent magnet loosely movably retained in the retaining hole, accommodated within the retaining hole by magnetic attraction between the permanent magnet and the rotary drive shaft at the time the clutch body is in a standstill state and, at the time the clutch body is in a driven state, caused to protrude toward the inner wall of the clutch drum by means of the centrifugal force and engage with one of the engaging protuberances.

The other objects and characteristic features of the present invention will become apparent from the further disclosure of this invention to be given hereinbelow with reference to the accompanying drawings.

BRIEF DESCRIPTION OF THE DRAWINGS

FIG. 7 is a front view showing a clutch body of the centrifugal clutch.

FIG. 8 is a plan view of the clutch body.

FIG. 9 is a front view showing a clutch drum of the centrifugal clutch.

FIG. 10 is a cross-sectional view taken along the line X—X in FIG. 9.

FIG. 11 is an elevation view showing a permanent magnet to be used in the centrifugal clutch.

FIG. 12 is a front view illustrating another embodiment of the clutch drum of the centrifugal clutch.

DETAILED DESCRIPTION OF THE PREFERRED EMBODIMENTS

Now, the present invention will be described hereinafter in more detail.

The centrifugal clutch of the present invention comprises a clutch drum loosely rotated relative to a rotary drive shaft, a clutch body loosely fitted within the clutch drum and an engaging permanent magnet retained in a retaining hole bored in the clutch body so as to be loosely movable in the radial direction. The rotary drive shaft which is made of a magnetic substance is inserted into the clutch body so that the clutch body may be driven. When the clutch body is not driven, the permanent magnet is moved toward the rotary drive shaft due to the magnetic attraction therebetween and is accommodated within the retaining hole. When the clutch body is being driven at a certain speed, the permanent magnet is released from the rotary drive shaft by the centrifugal force of the clutch body, projects toward the inner wall of the clutch drum and is engaged with an engaging protuberance provided in the clutch drum, with the result that the rotation of the clutch body is transmitted to the clutch drum.

Figure 1:
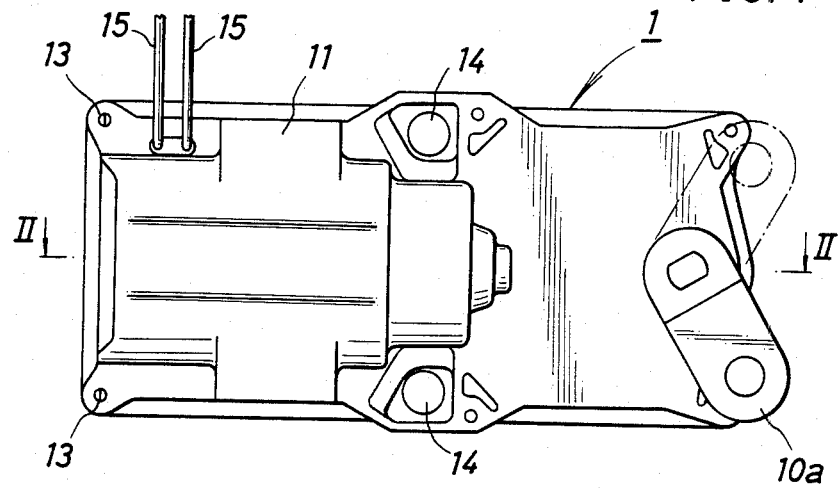
FIG. 1 is a plan view illustrating one embodiment of a centrifugal clutch according to the present invention applied to an actuator.
Figure 2:
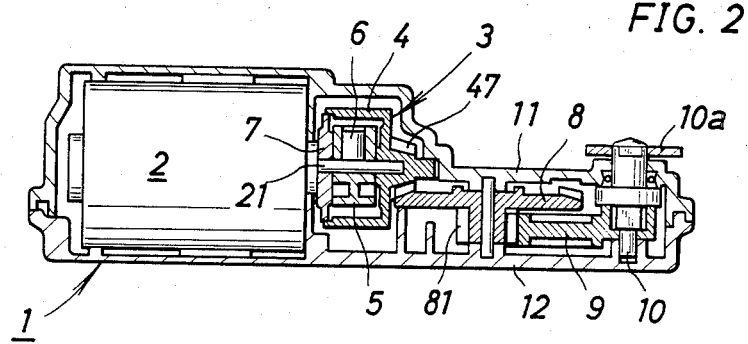
FIG. 2 is a cross-sectional view taken along the line II—II in FIG. 1.
Figure 3:
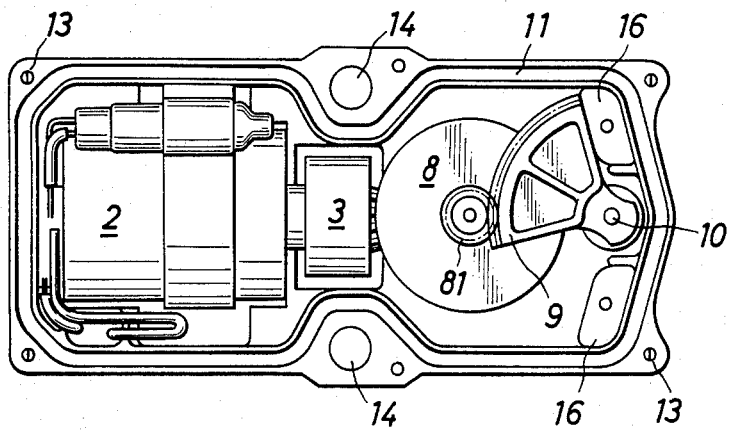
FIG. 3 is a bottom view illustrating the same embodiment, with the bottom plate of the casing removed.

This centrifugal clutch is applicable, for example, to an actuator for driving a motor for use in a door locking apparatus in an automobile as illustrated in FIG. 1 through FIG. 3.

In an actuator capable of remotely manipulating a door locking apparatus to lock or unlock an automobile door by use of a motor producing clockwise and counterclockwise rotations and also capable of manually operating the door locking apparatus, when the door locking apparatus is manually operated, the manual operation interferes with the motor and forces the motor to be rotated and, as a result, the manual operation is not smoothly effected. To eliminate this adverse problem, a clutch is used and serves to disconnect the motor and the door locking apparatus when the motor stops its rotation.

A motor 2 is disposed at one end within a casing 1 which has a cover plate 11 and a bottom plate 12 fastened to each other with screws 13. A rotary drive shaft 21 extends from the motor 2 toward the other end of the casing 1. To the rotary drive shaft 21 is attached a centrifugal clutch 3.

Figure 4:
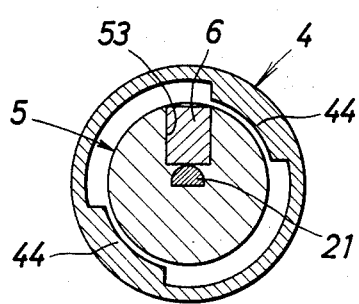
FIG. 4 is a lateral cross section showing the centrifugal clutch according to the present invention.

The centrifugal clutch 3 comprises, as illustrated in FIG. 4, a clutch drum 4 loosely rotatably supported on a clutch body 5 mounted on the rotary drive shaft 21 and driven by the rotary drive shaft 21, an engaging permanent magnet 6 loosely movable in the radial direction in radial hole 53 in body 5, and a lid member 7 tightly sealing one end of the clutch drum 4 having the clutch body 5 loosely fitted therein.

A bevel gear 47, shown in FIG. 2, is integrally formed with the other end of the clutch drum 4 and engaged with a movement transmission bevel gear 8 which rotates around an axis in a direction substantially at right angles relative to the axis of the rotary drive shaft 21. The movement transmission bevel gear 8 has on the rear surface thereon an integral spur gear 81 which is engaged with a sector gear 9. The sector gear 9 is firmly attached to a swing shaft 10 rotatably supported by the casing 1. To the swing shaft 10 is firmly attached a swing lever 10a.

The actuator is installed at a position suitable for operating the door locking apparatus by means of bolts inserted into bolt receiving apertures 14. The leading end of the swing lever 10a is connected to the door locking apparatus through the medium of a link mechanism (not shown). Electric wires 15 are connected to a source of electric power.

The centrifugal clutch 3 will be described in more detail with reference to FIG. 4. through FIG. 11.

The clutch drum 4 is, as illustrated in FIGS. 9 and 10, in the shape of a cylinder having an empty space 41 therein and opening out of one end thereof. The open end of the empty space 41 is provided with a groove 42 for receiving the lid member 7 therein. The cylindrical clutch drum 4 has large inner diameter portions 43 and engaging protuberances 44 symmetrically protruding inwardly from the large inner diameter portions 43. The rear wall 45 of the clutch drum 4 has an insertion hole 46 at the center thereof for loosely receiving and supporting therein the leading end of the rotary drive shaft 21. A bevel gear 47 is formed on the embossing surrounding the insertion hole 46 on the rear surface of the rear wall 45. An axial projection 48 protrudes from the center of the bevel gear 47 and is supported by the cover plate 11 of the casing 1.

The clutch body 5 is, as illustrated in FIGS. 7 and 8, in the shape of a cylinder having holes 51 bored therein for reducing the weight of the clutch body itself and has an outside diameter slightly smaller than the inside diameter of the engaging protuberances 44. The clutch body 5 is thus loosely fitted within the clutch drum 4 with a slight distance left therebetween. The clutch body 5 has a shaft hole 52 of a substantially semicircular cross section bored at the center thereof for receiving therein the rotary drive shaft 21 of the same cross section and is driven by the rotary drive shaft 21. Further, the clutch body 5 has the retaining hole 53 which opens outwardly in the radial direction from the shaft hole 52 for loosely movably retaining therein the engaging permanent magnet 6 as illustrated in FIG. 11. The clutch drum 4 and clutch body 5 are of non-magnetic material. The engaging permanent magnet 6 creates a magnetic attractive force between itself and the rotary drive shaft 21 which is made of a magnetic substance and is accommodated within the retaining hole 53 when the clutch body 5 is in a standstill state and, when the rotary drive shaft 21 is rotated in a clockwise direction or a counterclockwise direction at a given speed of rotation, the engaging permanent magnet 6 protrudes from the retaining hole 53 toward the inner wall of the clutch drum 4 due to a centrifugal force larger than the attracting force exerted between it and the rotary drive shaft 21 and has the leading end thereof engaged with one end of the engaging protuberance 44 of the clutch drum 4. The engaging permanent magnet in this embodiment is required to have a length large enough not to escape from the retaining hole 53 when it is engaged with the engaging protuberance 44 and to exhibit considerable mechanical strength.

Figure 5:
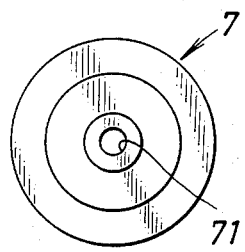
FIG. 5 is a front view illustrating a lid member for tightly sealing one end of the centrifugal clutch.
Figure 6:
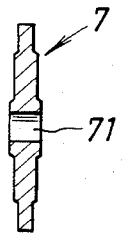
FIG. 6 is a diametrical cross section of the lid member.

The clutch body 5 is inserted into the clutch drum 4 and the lid member 7 as illustrated in FIGS. 5 and 6 is fitted in the groove 42 of the clutch drum 4. The lid member 7 has an insertion hole 71 bored therein for loosely receiving therein the rotary drive shaft 21.

Now, the operation of the centrifugal clutch according to the present invention will be described hereinafter.

When the rotary drive shaft 21 of the motor 2 is in a standstill state, since the engaging permanent magnet 6 moves toward the rotary drive shaft 21 due to the force of attraction therebetween and is accommodated within the retaining hole 53 of the clutch body 5, the clutch body 5 is kept in a state wherein it is loosely rotatable relative to the clutch drum 4 and does not transmit any movement to the clutch drum 4. When the door locking apparatus is manually operated, in this state, this manual operation causes the swing lever 10a to be swung and the resultant movement to be transmitted successively to the sector gear 9, spur gear 81, bevel gear 8, bevel gear 47 and clutch drum 4. Even though the clutch drum 4 is rotated in consequence of the successive transmission of movement, it is loosely rotated around the clutch body 5 because the aforementioned state is maintained. In other words, the rotation of the clutch drum 4 is not transmitted either to the clutch body 5 or to the motor 2.

When the door locking apparatus is operated mechanically, i.e. by means of the motor 2, a switching operation for either locking or unlocking the door causes an electric current to be supplied to the motor 2 and the rotary drive shaft 21 to be rotated in the direction corresponding to the switching operation. When the rotary drive shaft 21 is rotated at a given speed of rotation, the centrifugal force generated becomes larger than the attracting force between the engaging permanent magnet 6 and the rotary drive shaft 21 and causes the engaging permanent magnet 6 to loosely move within the retaining hole 53, protrude from the retaining hole 53 toward the inner wall of the clutch drum 4, come into contact with and slide on the large inner diameter portion 43 of the clutch drum 4, and engage with one end of the engaging protuberance 44. As a result, the rotation of the clutch body 5 given by the motor 2 is transmitted successively to the clutch drum 4, bevel gear 47, bevel gear 8, spur gear 81 and sector gear 9 and, consequently, the swing lever 10a is swung either ringwards or leftwards and causes the door locking apparatus to be operated through the medium of the link mechanism. Denoted by 16 in FIG. 3 is shock-absorbing means for receiving the sector gear 9 at the opposite extremities of the swinging movement of the sector gear 9.

FIG. 12 illustrates another embodiment of the clutch drum according to the present invention. The clutch drum 4a in this embodiment has a single engaging projection 44a formed on the inner wall thereof and has large inner diameter portions 43a formed in the vicinity of the opposite lateral ends of the engaging projection 44a and a minimum diameter portion 49 formed on the inner wall of the clutch drum 4a opposed to the center of the engaging projection 44a so that the inner diameter of the clutch drum 4a is gradually decreased from the large inner diameter portions 43a toward the minimum diameter portion 49. When the engaging permanent magnet 6 protrudes toward the inner wall of the clutch drum 4a, in this embodiment, there is little possibility of the engaging permanent magnet 6 protruding directly toward the large inner diameter portions 43a. The engaging permanent magnet 6, at first, protrudes toward the portion in the vicinity of the minimum inner diameter portion 49, then comes into sliding contact with the portion and continues its sliding movement toward the large inner diameter portion 43a. That is to say, since the projecting stroke of the engaging permanent magnet 6 becomes gradually larger from the vicinity of the minimum inner diameter portion 49 toward the large inner diameter portion 43a, the clutch drum 4a in this embodiment has an advantage that the noise generated when the engaging permanent magnet 6 protrudes toward the inner wall of the clutch drum 4a can be reduced.

According to the present invention, as described above, since a permanent magnet is used as an engaging member which fulfills its function when a centrifugal clutch is in motion, there can be provided a centrifugal clutch which has a simple construction, a reduced number of component parts, excellent durability, and which is inexpensive to manufacture and is operable with high precision.

Further, the present invention enjoys advantages that it is possible to provide good waterproofing and dust-preventing properties since the clutch drum is tightly sealed by the lid member, to obtain immediate engagement between the clutch drum and the clutch body during the operation of the centrifugal clutch where a number of engaging protuberances are provided on the inner wall of the clutch drum, and to cause the actuator to be operated smoothly because the speed of rotation is reduced by use of a plurality of gears. Thus, the present invention makes a great contribution to this art.

What is claimed is:

1. An actuator with a centrifugal positive clutch, comprising, in combination:
    an outer casing having a cover plate;
    a rotary drive shaft made of magnetic material;
    a clutch drum of non-magnetic material, said clutch drum being loosely rotatably mounted around said drive shaft, having a large inner diameter portion, having at least one engaging protuberance projecting inwardly from said large inner diameter portion, and having a bevel gear and an axial projection formed integrally at a rear wall of the clutch drum, said axial projection being supported by the cover plate;
    a clutch body of non-magnetic material loosely rotatably mounted within said clutch drum and mounted on said rotary drive shaft for being driven by said rotary drive shaft, said clutch body having a retaining hole extending radially from the center thereof toward the inner wall of said clutch drum;
    an engaging permanent magnet freely loosely movable in said retaining hole, said engaging permanent magnet having a length for being held completely within said retaining hole by the magnetic attraction between said permanent magnet and said rotary drive shaft when said clutch body is at a standstill and, when said clutch body is rotated faster than predetermined speed, being caused to protrude from said hole toward the inner wall of said clutch drum due soley to the centrifugal force generated and to engage with said engaging protuberance for driving said clutch drum; and
    a lid member tightly sealing one end of said clutch drum, being loosely rotatably mounted around said rotary drive shaft for blocking entrance of water and dust into the centrifugal clutch.

2. The actuator with a centrifugal positive clutch as claimed in claim 1 wherein said clutch drum has a single engaging projection, larger diameter portions on the opposite circumferential sides of said engaging projection and a smaller diameter portion diametrically opposite the center of said engaging projection, and has the inner diameter thereof decreasing gradually from the larger diameter portions to said smaller diameter portion.

* * * * *